(12) United States Patent
Nikai

(10) Patent No.: US 8,325,261 B2
(45) Date of Patent: Dec. 4, 2012

(54) SOLID-STATE IMAGING DEVICE, METHOD OF DRIVING SOLID-STATE IMAGING DEVICE, AND IMAGING APPARATUS

(75) Inventor: Norihiro Nikai, Kanagawa (JP)

(73) Assignee: Sony Corporation, Tokyo (JP)

( * ) Notice: Subject to any disclaimer, the term of this patent is extended or adjusted under 35 U.S.C. 154(b) by 220 days.

(21) Appl. No.: 12/805,302

(22) Filed: Jul. 23, 2010

(65) Prior Publication Data

US 2011/0032401 A1 Feb. 10, 2011

(30) Foreign Application Priority Data

Aug. 7, 2009 (JP) ................................. 2009-184204

(51) Int. Cl.
*H04N 5/335* (2006.01)
(52) U.S. Cl. ........................................................ 348/308
(58) Field of Classification Search .................... 348/308
See application file for complete search history.

(56) References Cited

U.S. PATENT DOCUMENTS

| 2008/0211951 | A1* | 9/2008 | Wakabayashi et al. | 348/308 |
| 2011/0019047 | A1* | 1/2011 | Suzuki et al. | 348/302 |
| 2012/0019697 | A1* | 1/2012 | Suzuki et al. | 348/308 |

FOREIGN PATENT DOCUMENTS

| JP | 2008-187565 | 8/2008 |
| JP | 2008-193373 | 8/2008 |

* cited by examiner

*Primary Examiner* — Tuan Ho
*Assistant Examiner* — Shahbaz Nazrul
(74) *Attorney, Agent, or Firm* — Rader Fishman & Grauer, PLLC

(57) ABSTRACT

A solid-state imaging device includes: a pixel unit in which a plurality of photoelectric conversion elements are arranged; a comparison unit comparing a reference signal with a signal acquired by the photoelectric conversion element of the pixel unit; a reference signal generating unit generating the reference signal; a counting unit counting an amount of time when the relative magnitude of the pixel signal and the reference signal is inverted by the comparison unit; and an offset setting unit setting an offset in the reference signal generated by the reference signal generating unit.

6 Claims, 15 Drawing Sheets

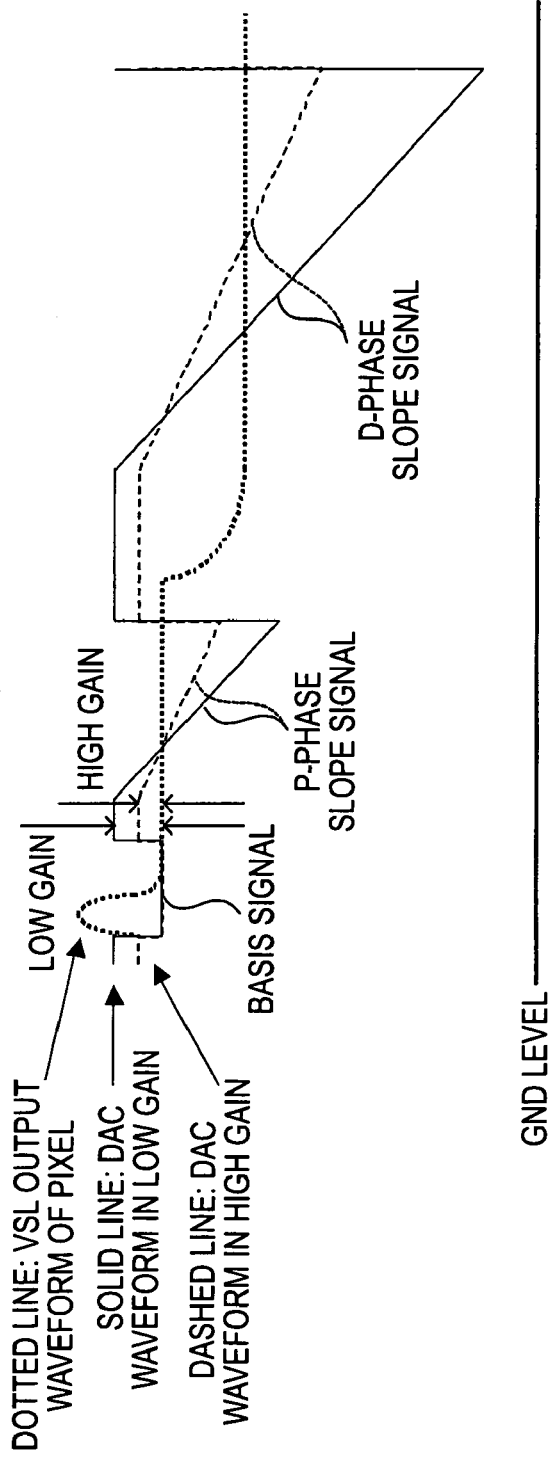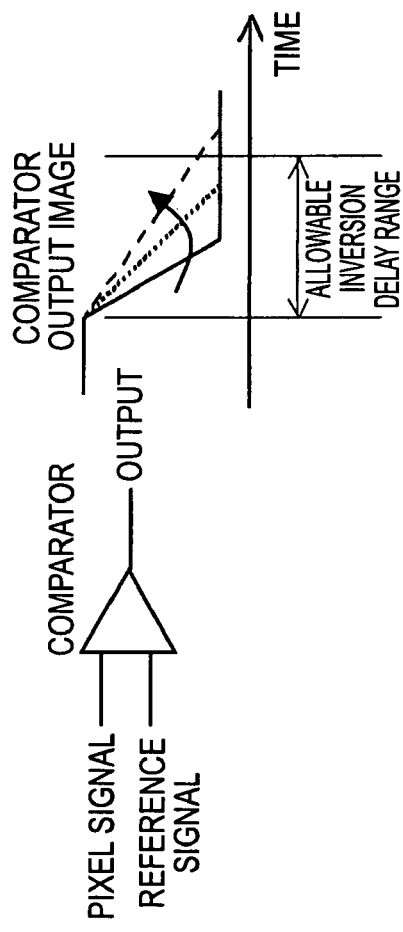

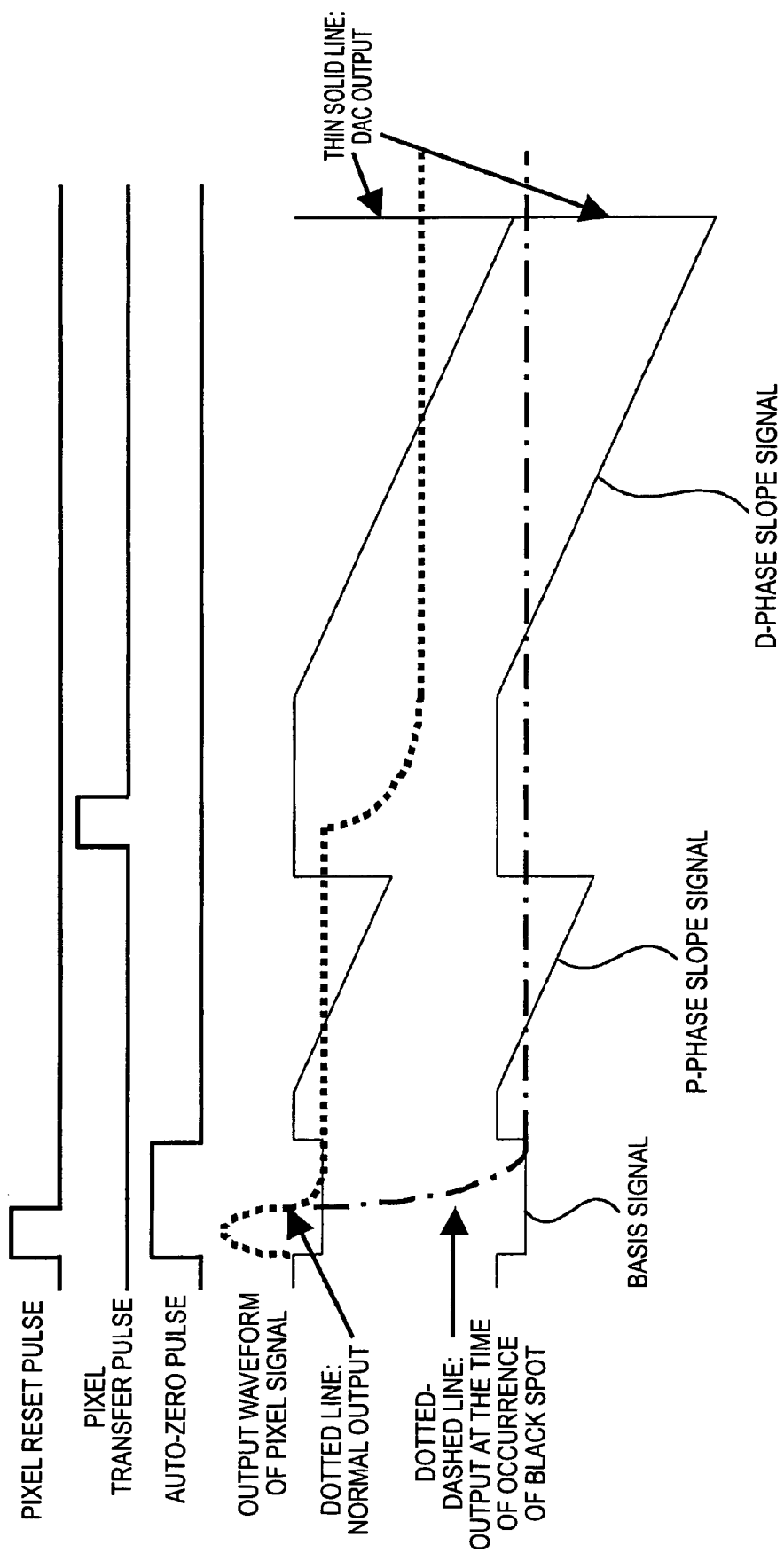

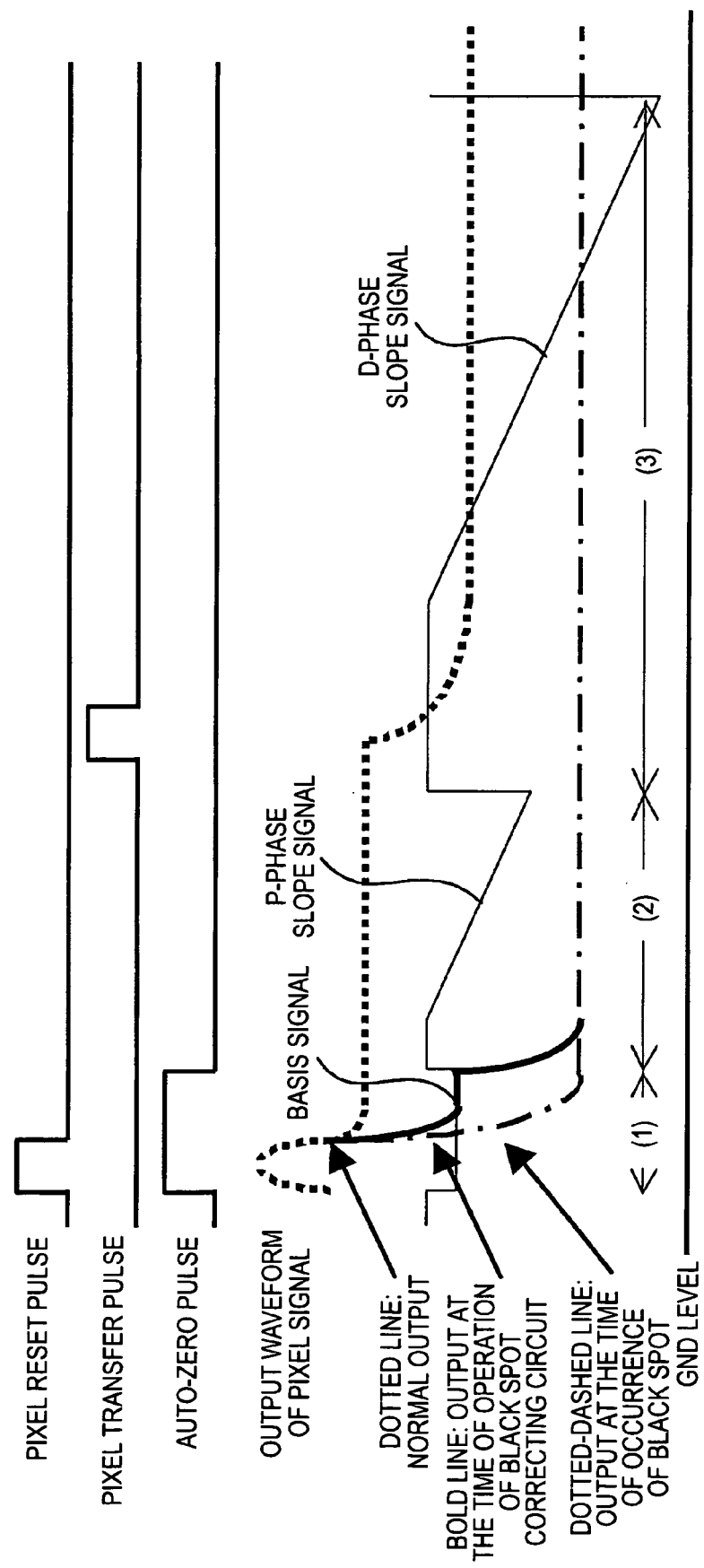

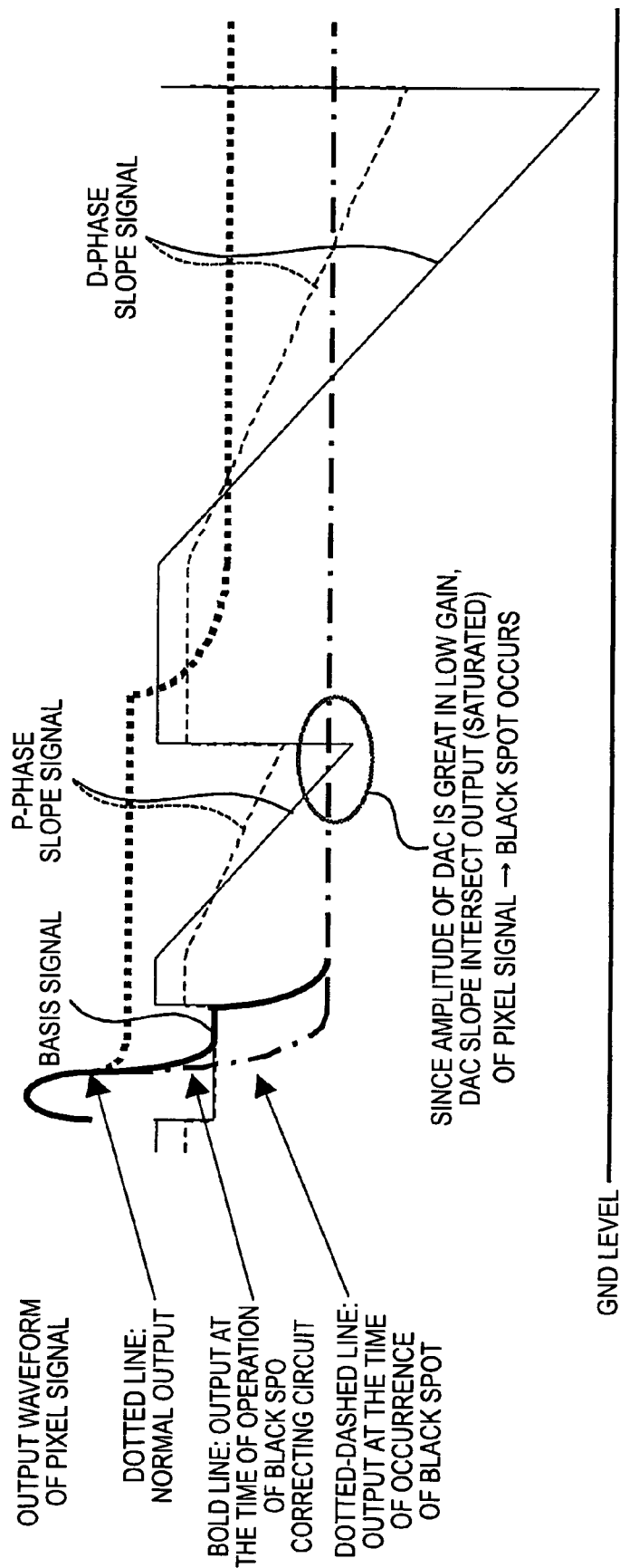

HIGH GAIN

LOW GAIN

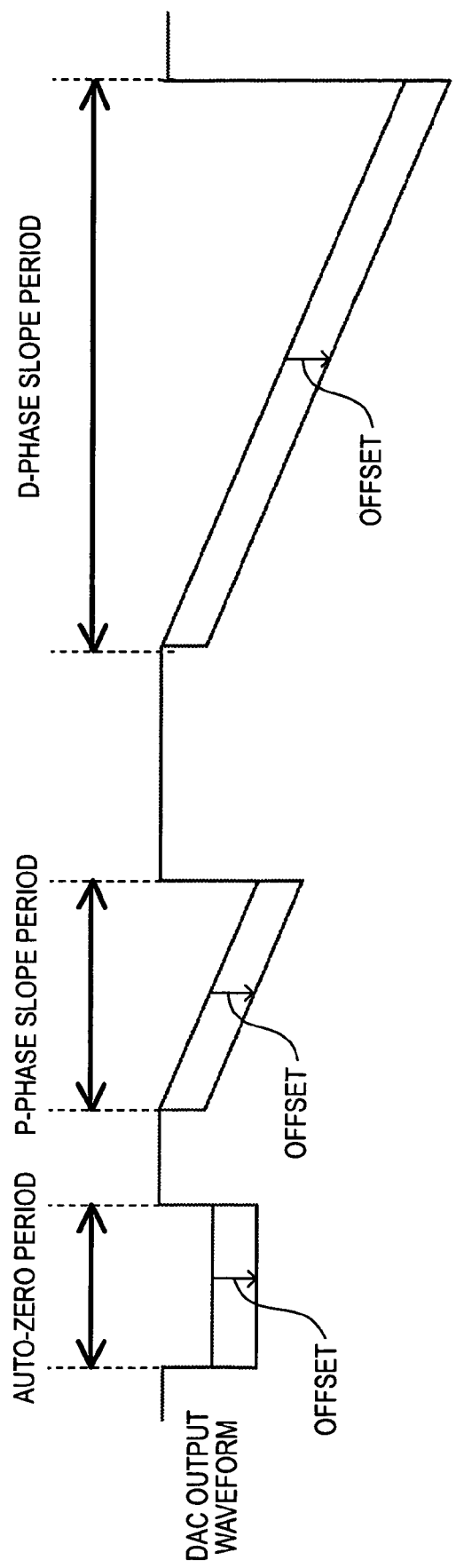

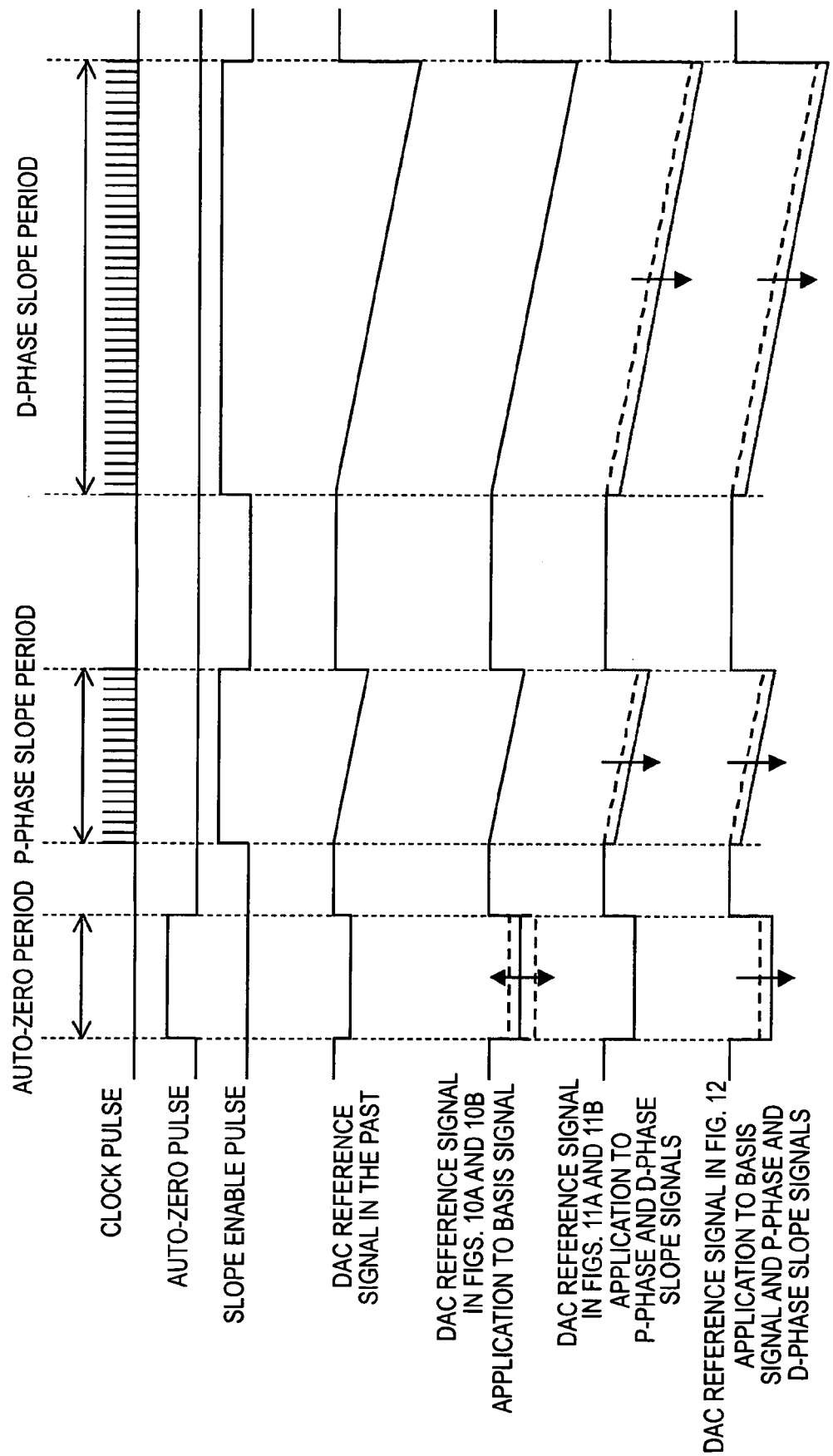

SOLID-STATE IMAGING DEVICE, METHOD OF DRIVING SOLID-STATE IMAGING DEVICE, AND IMAGING APPARATUS

BACKGROUND OF THE INVENTION

1. Field of the Invention

The present invention relates to a solid-state imaging device, a method of driving a solid-state imaging device, and an imaging apparatus, and more particularly, to a solid-state imaging device, a method of driving a solid-state imaging device, and an imaging apparatus in which an offset is set in a reference signal in analog-to-digital converting of a pixel signal.

2. Description of the Related Art

Solid-state imaging devices such as charge coupled devices (CCD) or complementary metal oxide semiconductors (CMOS) have been used for various applications. The CMOS type solid-state imaging devices suitable for higher-speed imaging have attracted attention and various architectures thereof have been suggested.

Here, in the analog-to-digital conversion in which pixel signals are converted into digital signals in the CMOS type solid-state imaging devices, a double-slope-type column ADC system in which two slope signals as the reference signal are compared with the pixel signals by a comparator is employed (for example, see JP-A-2008-187565 and JP-A-2008-193373).

In the CMOS type solid-state imaging devices employing the double-slope-type column ADC system, the amplitude of a basis signal in an auto-zero period of the reference signal output from the reference signal generating unit, the amplitude of a slope in a P-phase period, the amplitude of a slope in a D-phase period are changed in analog gain adjustment. The analog gain and the amplitudes of the reference signals are in inverse proportion to each other and the ratios of the amplitudes are constant.

SUMMARY OF THE INVENTION

However, in the CMOS type solid-state imaging devices employing the double-slope-type column ADC system, the trade-off relation between white spot appearance and vertical line appearance in high gain and black spot appearance in low gain becomes a problem.

That is, the appearance of a white spot in high gain is caused because the offset amplitude in the auto-zero period is set to be greater than the slope amplitude in the P-phase period and a pixel in which the inversion of the comparator in the P-phase slope is not generated due to the unevenness in the characteristics of the pixels thus exists.

On the other hand, the appearance of the vertical line is caused because the amplitude of the basis signal in the auto-zero period is reduced to avoid the appearance of the white spot when the gain is raised, and the inversion state of the comparator is badly affected.

The appearance of the black spot in low gain is caused because the difference between the amplitude of the basis signal at the time of auto-zero in high gain and the amplitude of the P-phase slope is greater than necessary as the gain is lowered.

Thus, it is desirable to suppress the vertical line and to suppress the white spot and the black spot in a solid-state imaging device employing a double-slope-type column ADC system.

According to an embodiment of the invention, there is provided a solid-state imaging device including: a pixel unit in which a plurality of photoelectric conversion elements are arranged; a comparison unit comparing a reference signal with a signal acquired by the photoelectric conversion element of the pixel unit; a reference signal generating unit generating the reference signal; a counting unit counting an amount of time when the relative magnitude of the pixel signal and the reference signal is inverted by the comparison unit; and an offset setting unit setting an offset in the reference signal generated by the reference signal generating unit.

According to this configuration, since the offset is set in the reference signal used in the comparison unit, signal variations in the photoelectric conversion elements can be absorbed by the amount of offset, thereby causing the comparison unit to accurately invert the signals.

Here, examples of the reference signal include a basis signal at the time of non-signaling from the pixel unit, a first slope signal (P-phase slope signal) for counting an amount of time corresponding to the non-signaling, and a second slope signal (D-phase slope signal) for counting an amount of time corresponding to the pixel signals.

In the configuration, the offset is set in the basis signal out of the reference signals, or the offset is set in the first slope signal and the second slope signal, or the offset is set in all of the basis signal, the first slope signal, and the second slope signal. Accordingly, even when the dynamic range of the slope signals is changed, it is possible to suppress the generation of the vertical line, the white spot, and the black spot based thereon.

According to another embodiment of the invention, there is provided a method of driving a solid-state imaging device having: a comparison unit comparing a reference signal with a signal acquired by a pixel unit; a reference signal generating unit generating the reference signal; and a counting unit counting an amount of time when the relative magnitude of the pixel signal and the reference signal is inverted by the comparison unit, the method including a step of setting an offset in the reference signal generated by the reference signal generating unit.

According to still another embodiment of the invention, there is provided an imaging apparatus including a solid-state imaging device acquiring an image signal from an image of a subject and a signal processor processing the signal acquired by the solid-state imaging device, wherein the solid-state imaging device includes: a pixel unit in which a plurality of photoelectric conversion elements are arranged; a comparison unit comparing a reference signal with a signal acquired by the photoelectric conversion element of the pixel unit; a reference signal generating unit generating the reference signal; a counting unit counting an amount of time when the relative magnitude of the pixel signal and the reference signal is inverted by the comparison unit; and an offset setting unit setting an offset in the reference signal generated by the reference signal generating unit.

According to this configuration, since the offset is set in the reference signal used in the comparison unit, signal variations in the photoelectric conversion elements can be absorbed by the amount of offset, thereby causing the comparison unit to accurately invert the signals.

According to the embodiments of the invention, it is possible to suppress the vertical line, the white spot, and the black spot in a solid-state imaging device.

BRIEF DESCRIPTION OF THE DRAWINGS

FIGS. 5A and 5B are diagrams illustrating a vertical line in high gain.

FIG. 7 is a diagram illustrating a black spot in large light intensity.

FIG. 8 is a diagram illustrating correction of the black spot in large light intensity.

FIG. 9 is a diagram illustrating a problem of the correction of the black spot in large light intensity.

FIG. 12 is a diagram illustrating the offsets in a basis signal, a P-phase slope signal, and a D-phase slope signal.

FIG. 13 is a timing diagram illustrating examples of the offsets shown in FIGS. 10A to 12 in parallel.

DESCRIPTION OF PREFERRED EMBODIMENTS

Hereinafter, mode for implementing the invention (hereinafter, referred to as "embodiment") will be described. The description is made in the following order.

1. Configuration of Solid-state Imaging Device (Entire Configuration, Configuration of DAC)
2. Double-slope-type Column ADC system (Timing Diagram, Analog Gain, Vertical Line in High Gain, White spot in High gain, Black spot in Large Light Intensity)
3. Method of Driving Solid-state Imaging Device (Offset in Auto-zero Basis Signal, Offsets in P-phase and D-phase Slope Signals, Offsets in Basis Signal and P-phase and D-phase Slope Signals, Offsets in Various Reference Signals)
4. Adaptive Setting of Offset
5. Specific Procedure of Setting Offset
6. Configuration of Imaging apparatus <1. Configuration of Solid-State Imaging Device>
[Entire Configuration]

Figure 1:
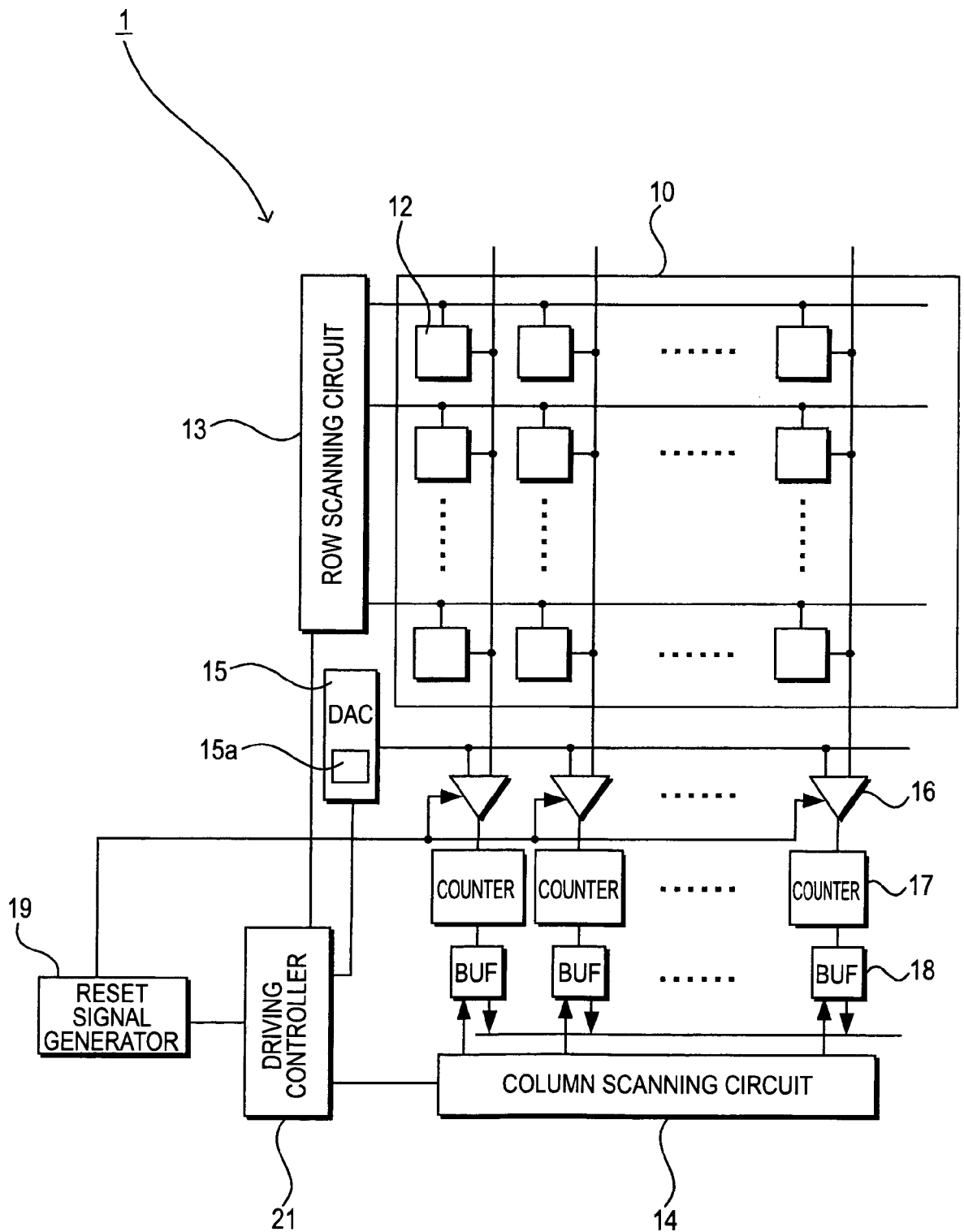
FIG. 1 is a block diagram illustrating a solid-state imaging device according to an embodiment of the invention.

FIG. 1 is a block diagram illustrating the configuration of a solid-state imaging device 1 according to an embodiment of the invention. That is, the solid-state imaging device 1 according to the embodiment includes a pixel unit 10 in which plural photoelectric conversion elements 12 are arranged, a comparator (comparison unit) 16 comparing a slope signal (reference signal), the value of which varies like steps, with a signal acquired by the photoelectric conversion element 12 of the pixel unit 10, and a DAC (reference signal generating unit) 15 generating the slope signal. The solid-state imaging device 1 further includes a counter (counting unit) 17 outputting as a digital value an amount of time when the relative magnitude of the pixel signal and the slope signal is changed by the comparator 16 and a buffer 18 temporarily storing the count value. The solid-state imaging device 1 further includes a reset signal generating unit (reset signal generating means) 19 generating a reset signal (auto-zero pulse signal) used to trigger a reset operation and input to the comparator 16 for the basic matching of the counter 17, a row scanning circuit 13 scanning rows of the photoelectric conversion elements 12 in the pixel unit 10, a column scanning circuit 14 scanning columns, and a driving controller 21 controlling the driving.

The pixel unit 10 has a configuration in which plural photoelectric conversion elements 12 are arranged in a matrix. The photoelectric conversion elements 12 are scanned in the row direction by the row scanning circuit 13 and the pixel signals thereof are sequentially sent to the comparator 16. The slope signal to be compared with the pixel signal is input to the comparator 16 from the DAC 15. The slope signal is a signal of which the level gradually varies at a constant rate. The comparator 16 detects at what level the comparison result with the pixel signal is inverted.

As the comparison result in the comparator 16, the time until the relative magnitude of the pixel signal and the slope signal is inverted is counted by an up-down counter 17 and the count value is stored in the buffer 18. The value of every column stored in the buffer 18 is sequentially scanned by the column scanning circuit 14 and the resultant signal is output. The units are controlled by the driving controller 21.

The solid-state imaging device 1 according to this embodiment includes an offset setting unit 15a setting a predetermined offset in the slope signal generated from the DAC 15. In this embodiment, the offset setting unit 15a is disposed in the DAC 15. The offset setting unit 15a may be disposed outside the DAC 15.

[Configuration of DAC]

Figure 2:
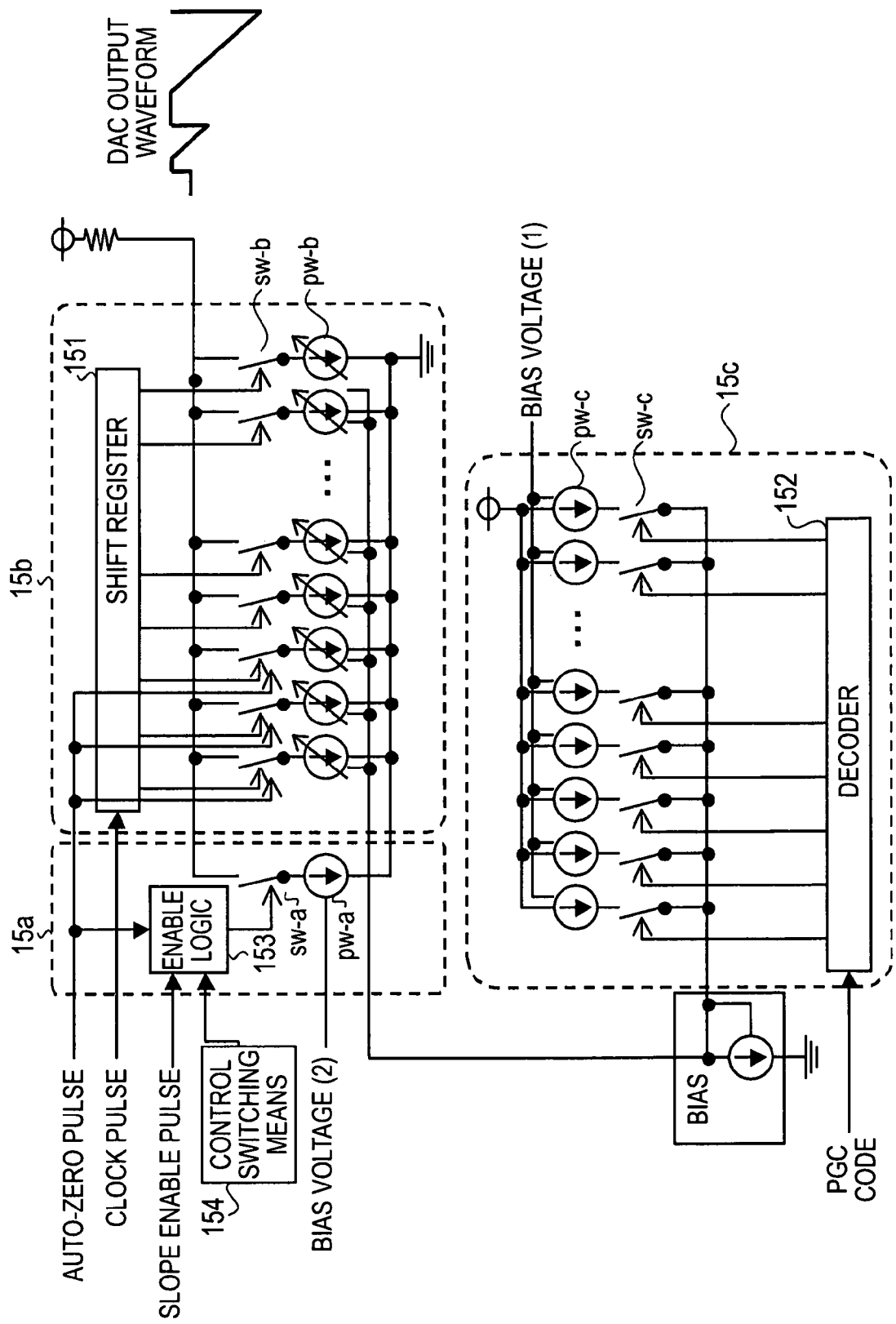
FIG. 2 is a diagram illustrating a configuration of a DAC applied to the solid-state imaging device according to the embodiment of the invention.

FIG. 2 is a diagram illustrating the configuration of the DAC applied to the solid-state imaging device according to this embodiment. The DAC includes an offset generating unit 15a, a slope signal generating circuit 15b, and a gain control circuit 15c.

The slope signal generating circuit 15b includes a shift register 151 and plural stages of variable current sources pw-b. A switch sw-b is disposed between the shift register 151 and each variable current source pw-b. The switch sw-b is selected by the signal sequentially output from the shift register 151 in response to a clock pulse and the number of stages of the selected variable current sources pw-b slowly increases to generate the slope signal. When the auto-zero pulse is input to the shift register 151, the switches sw-b corresponding to a predetermined number of stages are selected and a reference voltage corresponding to the number of stages of the selected variable current source pw-b is generated.

The gain control circuit 15c includes a decoder 152 and plural stages of current sources pw-c. A switch sw-c is disposed between the decoder 152 and each current source pw-c. An amplification control signal (PCG CODE) is input to the decoder 152 and is decoded by the decoder 152. The number of selected switches sw-c is set in response to the decoded value and the number of stages of the current sources pw-c is determined. A bias voltage (1) is applied to the current sources pw-c and current corresponding to the number of stages of the selected current sources pw-c is applied as a bias to the variable current sources pw-b of the slope signal generating circuit 15b. Accordingly, the slope of the slope signal is set by the bias current applied to the slope signal generating circuit 15b from the gain control circuit 15c.

The offset setting unit 15a includes an Enable logic 153 and a current source pw-a to which a bias voltage (2) is applied. The Enable logic 153 controls ON and OFF of the offset operation arbitrarily or fixedly with reference to an auto-zero pulse, a slope enable pulse, and a control signal output from a control switching unit 154. When the offset operation is performed, a signal for selecting the switch sw-a is output from the Enable logic 153 and the current is sent to the output line of the slope signal generating circuit 15b from the current source pw-a to which the bias voltage (2) is applied. Accordingly, a predetermined bias is superposed on the reference voltage (reference signal) output from the slope signal generating circuit 15b.

Here, the offset setting unit 15a does not depend on the bias corresponding to the gain sent to the slope signal generating circuit 15b from the gain control circuit 15c. The control switching unit 154 is not particularly limited, but may be an external control signal which can be changed by software, a hardware external control signal based on wire bonding, and a hardware internal signal based on connection change of inner wires of semiconductor. The bias voltage (2) may be a preset fixed value or may be a value varying under the control of a controller not shown.

In this embodiment, in the configurations of the solid-state imaging device 1 and the DAC 15, the offset setting unit 15a sets a predetermined offset in the reference signal output from the DAC 15.

A specific example where the offset setting unit 15a sets the offset includes an example where a predetermined offset is set in a basis signal (auto-zero signal) at the time of non-signaling from the photoelectric conversion elements out of the reference signals.

A specific example where the offset setting unit 15a sets the offset includes an example where a predetermined offset is set in a P-phase slope signal and a D-phase slope signal. Here, the P-phase slope signal is a first slope signal for allowing the counter to count an amount of time corresponding to the non-signaling from the photoelectric conversion elements out of the reference signals. The D-phase slope signal is a second slope signal for allowing the counter to count an amount of time corresponding to the pixel signals acquired by the photoelectric conversion elements.

A specific example where the offset setting unit 15a sets the offset includes an example where a predetermined offset is set in the auto-zero signal, the P-phase slope signal, and the D-phase slope signal.

At the time of setting the offset in the basis signal, the offset setting unit 15a sets the offset so that a predetermined offset is subtracted from the maximum value of the basis signal, or sets the offset so that the P-phase slope signal and the D-phase slope signal move to the level of the basis signal.

The offset setting unit 15a sets the same amount of offset in the P-phase slope signal and the D-phase slope signal, or sets the same amount of offset in the basis signal, the P-phase slope signal, and the D-phase slope signal.

The offset setting unit 15a sets an offset, which varies depending on the gain in the gain control circuit 15c, at the time of setting the offset in the basis signal, the P-phase slope signal, and the D-phase slope signal. Here, the gain in the gain control circuit 15c means an amplification factor in dynamic range of the P-phase slope signal and the D-phase slope signal.

<2. Double-slope-type Column ADC System>
[Timing Diagram]

Figure 3:
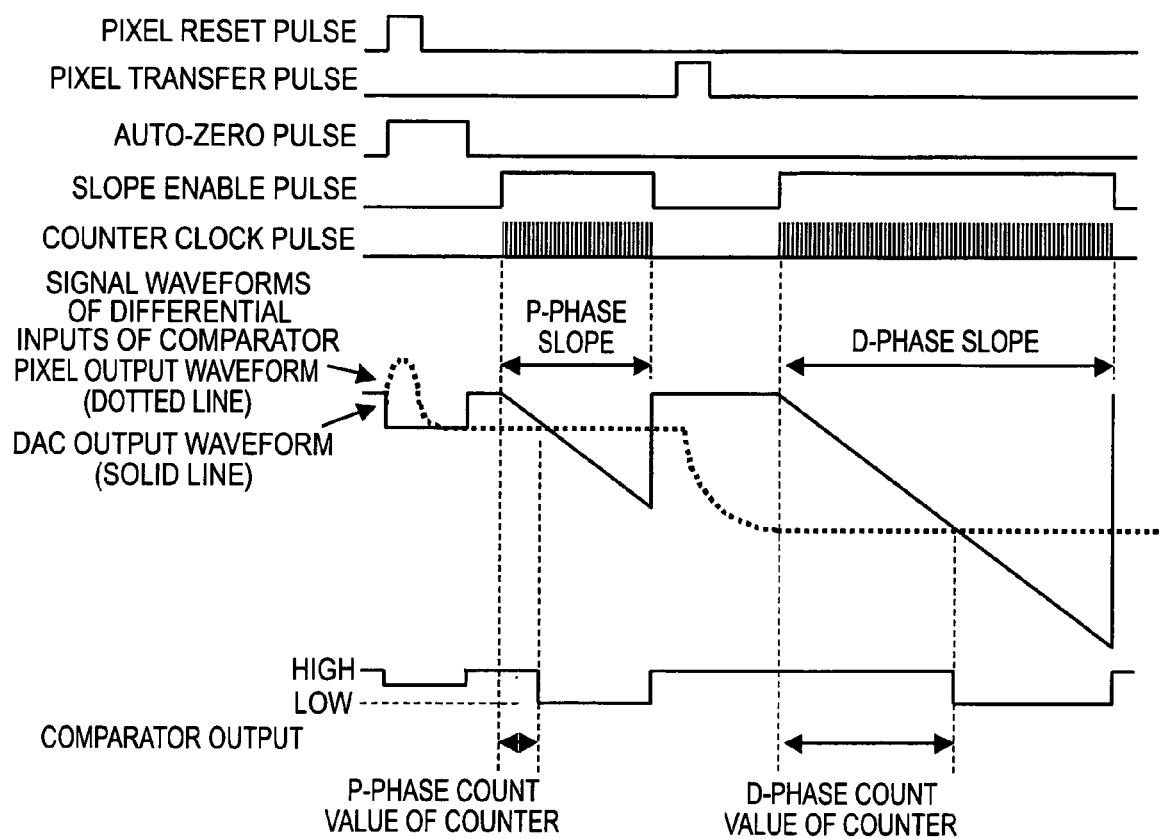
FIG. 3 is a timing diagram in a double-slope-type column ADC system.

The double-slope-type column ADC system will be described. FIG. 3 is a timing diagram in the double-slope-type column ADC system. This timing diagram shows the times of various signals in each photoelectric conversion element in a period from the reset to the reading of the pixel signal.

First, the auto-zero pulse is changed to ON in synchronization with ON of the pixel reset pulse. When the auto-zero pulse is in ON, the basis signal is output from the DAC and the output value of the zero level of a pixel can be correlated with the basis signal. This operation is called auto-zero (the same is true in the following description). The basis signal set in the auto-zero is an operating point of the comparator.

Then, when the auto-zero pulse is changed to OFF and then the slope enable pulse is changed to ON, the P-phase slope signal is output to the comparator from the DAC. The comparator compares the P-phase slope signal with the output value of a zero level sent from the photoelectric conversion element. In the comparison operation of the comparator, when the P-phase slope signal is equal to the output value of a zero level, the polarity of the output of the comparator is inverted. On the other hand, when the slope enable pulse is in the ON state, a counter clock pulse is input to the counter. The counter counts the number of counter clock pulses until the output of the comparator is inverted after the slope enable pulse is changed to the ON state. The count value (count value N1) is stored in the buffer.

Then, when the pixel transfer pulse is changed to the ON state, the pixel signal acquired by the photoelectric conversion element is read and sent to the comparator. Thereafter, when the slope enable pulse is changed again to the ON state, the D-phase slope signal is output to the comparator from the DAC. The comparator compares the D-phase slope signal with the pixel signal sent from the photoelectric conversion element. In the comparison operation of the comparator, when the D-phase slope signal is equal to the pixel signal, the polarity of the output of the comparator is inverted. On the other hand, when the slope enable pulse is in the ON state, the counter clock pulse is input to the counter. The counter counts the number of counter clock pulses until the output of the comparator is inverted after the slope enable pulse is changed to the ON state. The count value (count value N2) is stored in the buffer.

Thereafter, the count values N1 and N2 stored in the buffer are sent to the signal processing circuit in the subsequent stage and a pixel signal obtained by removing a noise component of the photoelectric conversion element is generated by calculating the count value N2−the count value N1.

[Analog Gain]

Figure 4:
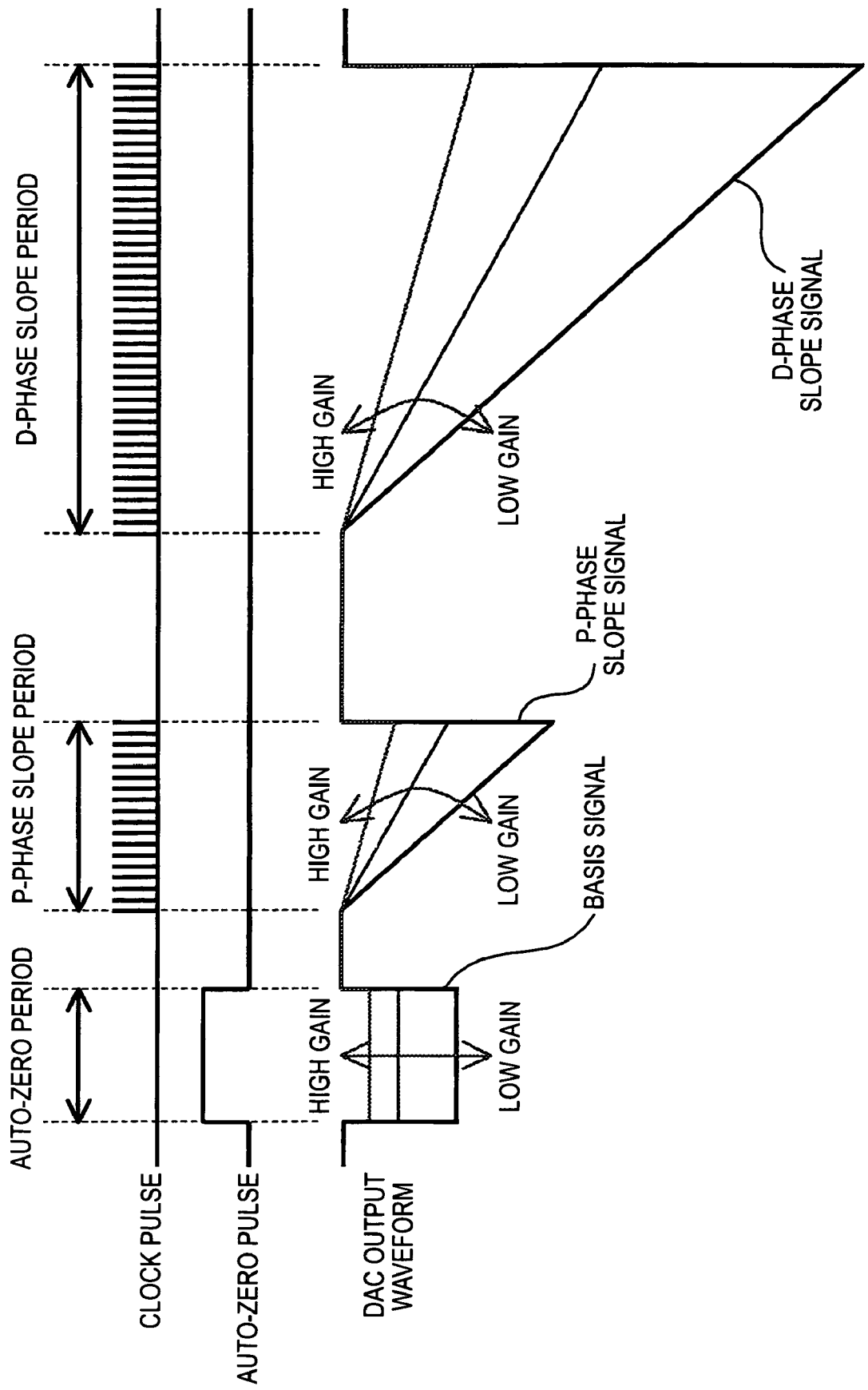
FIG. 4 is a diagram illustrating a change in reference signal due to adjustment of analog gain.

FIG. 4 is a diagram illustrating the variation of the reference signal due to the analog gain adjustment. In the drawing, only the waveforms of the count clock pulse, the auto-zero pulse, and the DAC output (waveform of the reference signal) out of the timing diagram shown in FIG. 3 are shown. The analog gain corresponds to a bias sent to the slope signal generating circuit 15b from the gain control circuit 15c in the configuration of the DAC shown in FIG. 2. The analog gain is set depending on the light sensitivity of the solid-state imaging device. That is, the gain is higher as the light sensitivity becomes higher, and the gain is lower as the light sensitivity becomes lower.

In the reference signals, the amplitude of the basis signal is smaller as the analog gain becomes higher, and the amplitude is greater as the analog gain becomes lower. In the P-phase slope signal and the D-phase slope signal, the amplitude of the peak part is smaller as the gain becomes higher and the amplitude of the peak part is greater as the gain becomes lower. That is, the slope is smaller as the gain becomes higher and the slope is greater as the gain becomes lower. As the slopes of the P-phase slope signal and the D-phase slope signal become smaller, the number of counts for representing one gray scale of a signal increases and the resolution increases.

Here, when the amplitude of the reference signal is adjusted depending on the analog gain, the following phenomena are known.

[Vertical Line in High Gain]

FIGS. 5A and 5B are diagrams illustrating a vertical line in high gain, where FIG. 5A is a timing diagram illustrating the reference signals and the pixel signal and FIG. 5B is a diagram illustrating the image of the output of the comparator. As described above, as the analog gain becomes higher, the amplitude of the reference signal output from the DAC becomes smaller. The solid line of the reference signal shown in FIG. 5A represents a low gain and the dotted line represents a high gain. Here, as shown in FIG. 5B, the comparator can more easily cause a variation in output of the comparator as the amplitude of the reference signal sent from the DAC becomes smaller. That is, as the amplitude of the reference signal becomes smaller, the inversion delay in output of the comparator increases. Accordingly, the output of the comparator may not be inverted in the P-phase slope period. Particularly, an image having a strong vertical correlation due to the variation in output of the comparator, that is, a phenomenon that a vertical line appears, can be easily generated in high gain.

[White Spot in High Gain]

Figure 6:
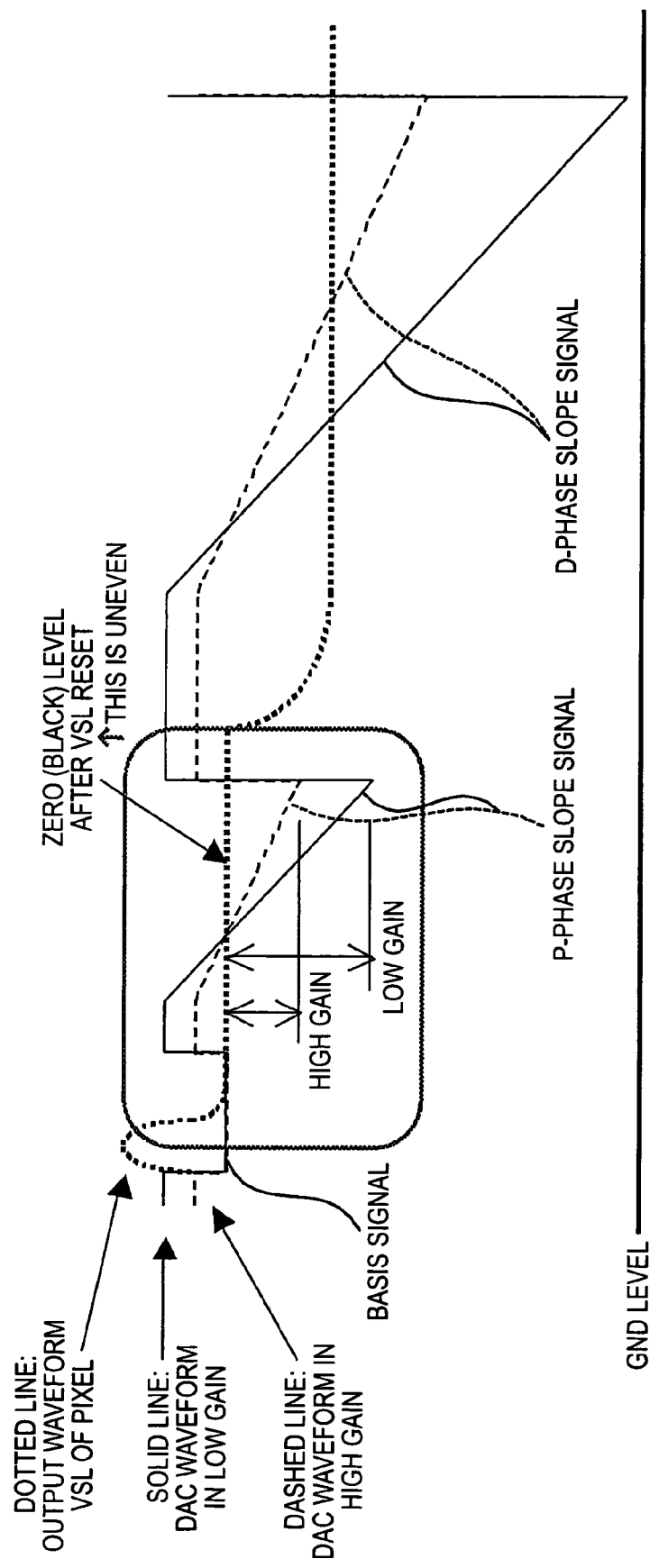
FIG. 6 is a diagram illustrating a white spot in high gain.

FIG. 6 is a timing diagram illustrating a white spot in high gain, where the reference signals and the pixel signal are shown. As described above, the amplitude of the reference signal output from the DAC is smaller as the analog gain becomes higher. In the reference signal shown in FIG. 6, the solid line indicates the reference signal in low gain and the dotted line indicates the reference signal in high gain. Here, as the gain becomes higher, the amplitude of the P-phase slope signal becomes smaller and the slope decreases, whereby the unevenness of the pixel signals has a large influence on the inversion time of the output of the comparator. Accordingly, the output of the comparator may not be inverted in the P-phase slope period. In this way, when a phenomenon that the output of the comparator is not inverted in the P-phase slope period occurs, it is considered that a black spot appears and thus a white spot is output by the operation of a black spot correcting circuit. Here, the black spot correcting circuit is a circuit setting the basis signal in the auto-zero period not to be lower than the lower limit of the pixel signal when intensity light is incident. Accordingly, the output of the comparator is forcibly set not to be inverted in the P-phase slope period. The comparator senses that the comparison result is not inverted in the P-phase slope period and corrects its output so as to count the white spot in this case.

[Black Spot in Large Light Intensity]

FIG. 7 is a diagram illustrating a black spot in great light intensity, in which the pixel reset pulse, the pixel transfer pulse, the auto-zero pulse, the pixel signal, and the reference signal are shown. In the drawing, the dotted line indicates a pixel signal of a normal level and the dotted-dashed line indicates a pixel signal when a black spot is generated.

In the pixel signal of a normal level, the auto-zero is set using the zero level of the pixel signal and the basis signal of the DAC, and the count value (N1) of the zero level is counted using the P-phase slope signal. Thereafter, the count value (N2) of the signal level of the pixel is counted using the D-phase slope signal and the signal amplitude is acquired by N2−N1.

When a black spot appears, the potential of the floating diffusion of each pixel is refreshed to a zero level with a reset pulse, but electrons overflow from the photoelectric conversion element into the floating diffusion due to the intensity of incident light. Accordingly, the floating diffusion is saturated with the electrons regardless of the existence of a transfer pulse. For this reason, in any of the period where the pixel signal is set to the zero level, the P-phase slope period, and the D-phase slope period, the pixel signal reaches the maximum amplitude which can be output. When the auto-zero setting of the comparator is performed at this level, the count value (N1) of the zero level is counted using the P-phase slope signal, the count value (N2) of the signal level of the pixel is counted using the D-phase slope signal, and the computation of the total output=N2−N1 is performed, the total output=zero (black) is then output.

FIG. 8 is a diagram illustrating the correcting of a black spot in great light intensity. As described above, the following correction is performed to avoid a black spot from being output while receiving light with great intensity. In FIG. 8, a timing diagram illustrating the pixel reset pulse, the pixel transfer pulse, the auto-zero pulse, the pixel signal, and the reference signal is shown. In the drawing, the dotted line represents a pixel signal of a normal level, the dotted-dashed line represents a pixel signal at the time of occurrence of a black spot, and the bold line represents a pixel signal when the black spot correction is performed.

Here, the following processes are performed in periods (1) to (3) to detect and correct a black spot.

(1) In advance, a dummy source follower circuit along with a pixel is connected to a signal line of a pixel signal and a predetermined analog voltage is applied thereto. The dummy source follower circuit is activated only in the auto-zero setting period. Here, even when intensity light is incident, the level of the basis signal is set not to be lower than the lower limit of the pixel signal in setting the auto-zero.

(2) When the auto-zero setting period expires, the dummy source follower circuit is deactivated. When intensity light is incident, the pixel signal reaches the lower limit. Accordingly, in the P-phase slope period, the P-phase slope signal and the pixel signal are not mixed.

(3) In the comparator, the non-inversion of the comparison result in the P-phase slope period is used as a determination criterion for sensing the "light intensity of such a level that a black spot in great light intensity is generated". Accordingly, the comparator outputs full count (for example, 3FF in 10-bit analog-digital conversion)=white. That is, the calculation of the count value (N2) of the signal level of the pixel using the D-phase slope signal−the count value (N1) of the zero level using the P-phase slope signal is neglected. Accordingly, the black spot is corrected into white.

FIG. 9 is a diagram illustrating a problem in correcting the black spot in great light intensity. In this drawing, the timing diagram illustrating a reference signal and a pixel signal is shown. In this drawing, the dotted line represents a pixel signal of a normal level, the dotted-dashed line represents a pixel signal when a black spot is generated, and the bold line represents a pixel signal when the black spot is corrected.

In the setting of the analog gain described above, the P-phase slope signal and the D-phase slope signal have a smaller amplitude in the peak part as the gain becomes higher (see the dotted line in the drawing), and have a greater amplitude in the peak part as the gain becomes lower (see the solid line in the drawing). Accordingly, when the amplitude of the P-phase slope in low gain becomes higher, the amplitude of the P-phase slope may be greater than the lower limit level of the basis signal in the setting of the auto-zero to correct the black spot. For this reason, the comparator output is inverted in the P-phase slope period and thus the determination criterion for allowing the comparator to sense the "light intensity of such a level that a black spot in great light intensity is generated" is not satisfied. Therefore, the calculation of the count value (N2) of the signal level of the pixel using the D-phase slope signal—the count value (N1) of the zero level using the P-phase slope signal results in zero count, thereby outputting black. That is, even when it is intended to output white through the correction of the black spot, black is output without being corrected.

<3. Method of Driving Solid-state Imaging Device>

In this embodiment, the following driving method is performed to solve the problems in vertical line, black spot, and white spot depending on the analog gain.

[Offset in Auto-zero Basis Signal]

Figure 10A:
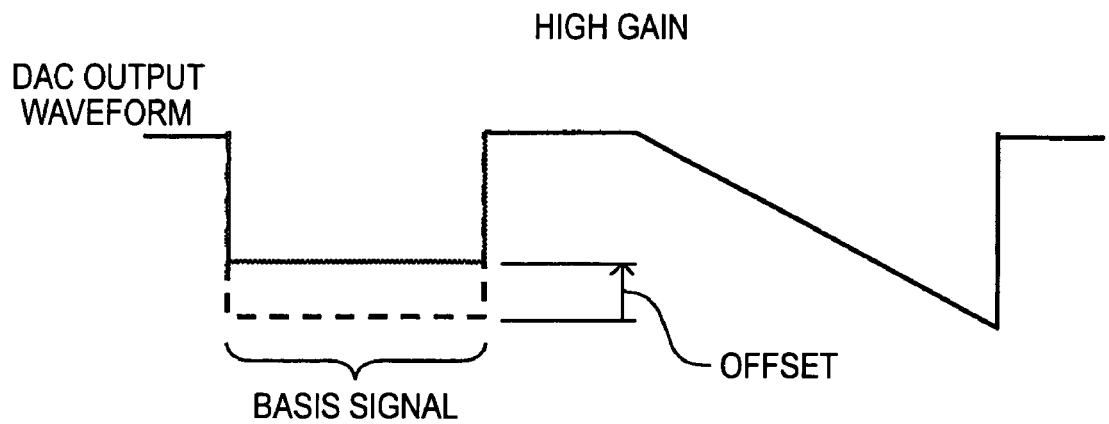
FIGS. 10A and 10B are diagrams illustrating an offset in a basis signal set in an auto-zero period.
Figure 10B:
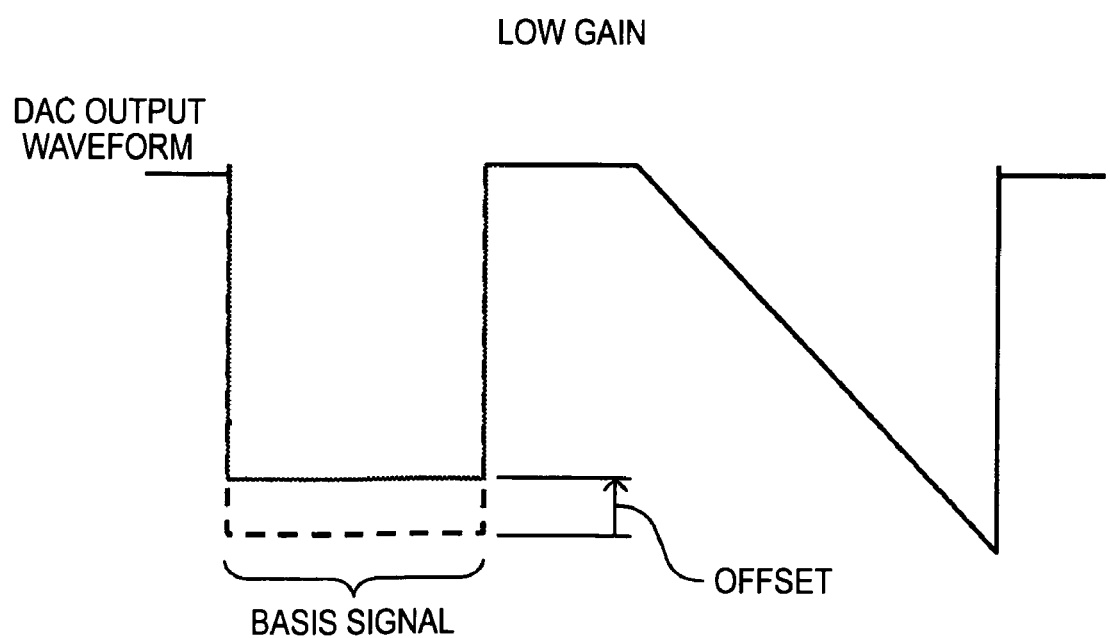

FIGS. 10A and 10B are diagrams illustrating the offset in the basis signal set in the auto-zero period, where FIG. 10A shows the offset in high gain and FIG. 10B shows the offset in low gain. As shown in FIG. 10A, it is set in high gain to subtract a predetermined offset from the maximum amplitude level of the basis signal set in the auto-zero period so as not to generate the vertical line shown in FIGS. 5A and 5B or to allow the white spot shown in FIG. 6 not to appear. Here, the maximum amplitude of the basis signal is at the same level as the maximum amplitude of the P-phase slope signal. The amount of offset is determined in consideration of the unevenness in zero level of the photoelectric conversion element or the unevenness in inversion delay of the comparator.

In this way, by providing the offset to the level of the basis signal set in the auto-zero period, a margin is guaranteed between the amplitude of the basis signal and the P-phase slope signal. In the low gain shown in FIG. 10B, it is also set to subtract a predetermined offset from the maximum amplitude level of the basis signal. The amplitude of the basis signal of the auto-zero and the amplitude of the P-phase slope signal increase in the low gain in rough inverse proportion to the gain, but the minimum offset given in the high gain is guaranteed, thereby causing the peak difference therebetween to suppress the appearance of the black spot in the low gain shown in FIG. 9.

[Offsets in P-phase and D-phase Slope Signals]

Figure 11A:
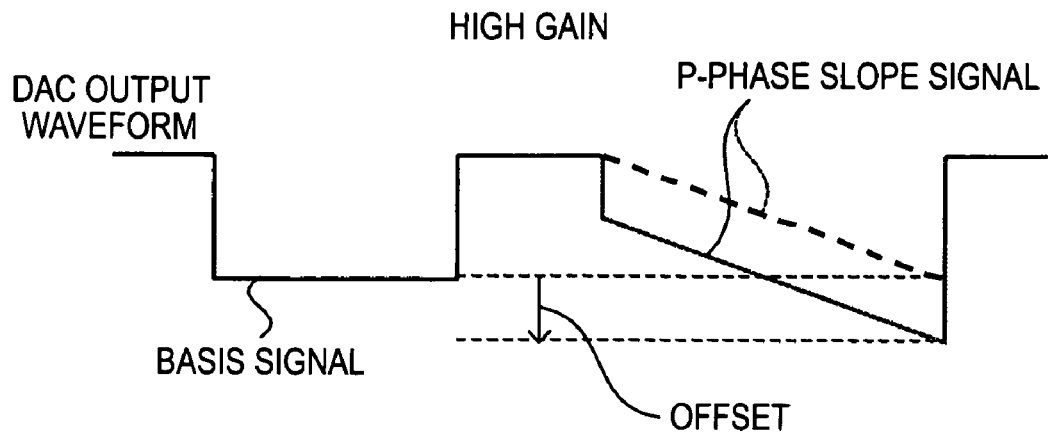
FIGS. 11A and 11B are diagrams illustrating offsets in a P-phase slope signal and a D-phase slope signal.
Figure 11B:
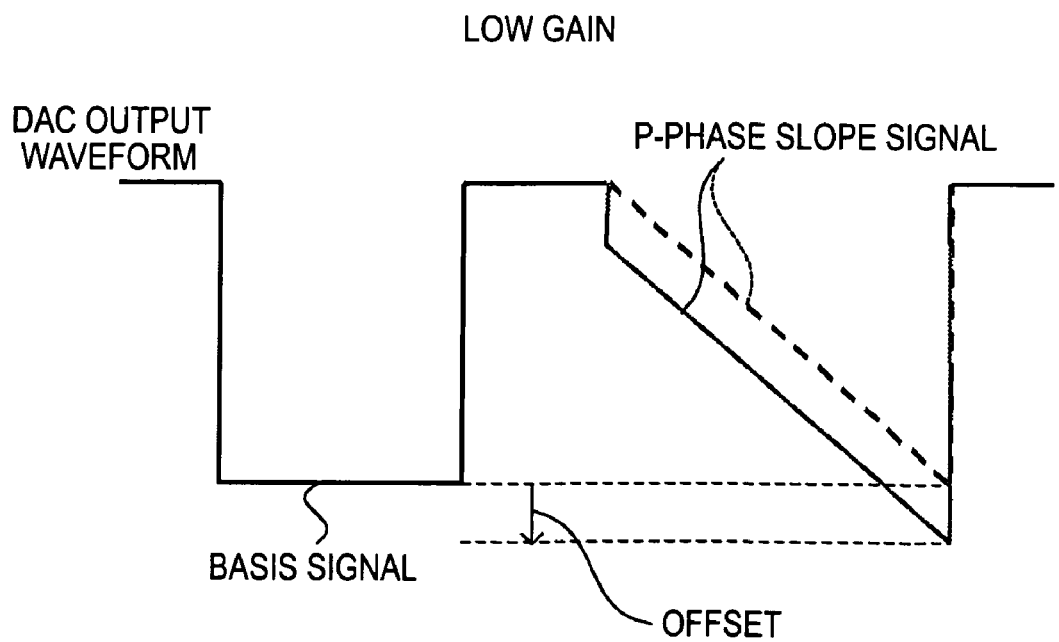

FIGS. 11A and 11B are diagrams illustrating the offsets in the P-phase slope signal and the D-phase slope signal, where FIG. 11A shows the offsets in high gain and FIG. 11B shows the offsets in low gain. In this example, the appearance of a white spot in the high gain and the appearance of a black spot in the low gain are suppressed. In this example, in the high gain shown in FIG. 11A and the low gain shown in FIG. 11B, an offset is added to the P-phase slope signal. At this time, the offset is added toward the level of the basis signal. In the P-phase slope signal, the offset is superposed on the level without changing the slope. Accordingly, a margin is guaranteed between the amplitude of the basis signal and the amplitude of the P-phase slope signal in the auto-zero period, thereby suppressing the appearance of the black spot in the high gain.

Although not shown in FIGS. 11A and 11B, the same offset as added to the P-phase slope signal is added to the D-phase slope signal to match the basic levels of the P-phase slope signal and the D-phase slope signal with each other.

[Offsets in Basis Signal and P-phase and D-phase Slope Signals]

FIG. 12 is a diagram illustrating the offsets in the basis signal, the P-phase slope signal, and the D-phase slope signal. In this example, first, an offset is added to the basis signal in the auto-zero period to suppress the appearance of the vertical line, thereby maximizing the basis signal. The amplitude of the basis signal has the same level as the amplitude of the P-phase slope signal by this maximization. In this state, since no margin exists between the amplitude of the basis signal and the amplitude of the P-phase slope signal, the same offset as added to the basis signal in the auto-zero period is added to the P-phase slope signal. The offset is given toward the level of the basis signal. In the P-phase slope signal, the offset is superposed on the level without changing the slope. Accordingly, the same margin before the basis signal is maximized is guaranteed, thereby preventing a black spot from appearing in the high gain.

At this time, to match the basic levels of the P-phase slope signal and the D-phase slope signal with each other, the same offset as added to the basis signal in the auto-zero period is added to the D-phase slope signal toward the level of the basis signal. In the D-phase slope signal, the offset is superposed on the level without changing the slope.

[Offsets in Various Reference Signals]

FIG. 13 is a timing diagram illustrating examples of setting an offset in parallel, which are shown in FIGS. 10A to 12. In this embodiment, a peak difference between the amplitude of the basis signal and the amplitude of the P-phase slope signal in the auto-zero setting does not depend on the gain and is kept as a predetermined voltage amplitude difference. Which of the offsets shown in FIGS. 10A to 12 should be used can be properly determined by the specification of a solid-state imaging device.

<4. Adaptive Setting of Offset>

Figure 14:
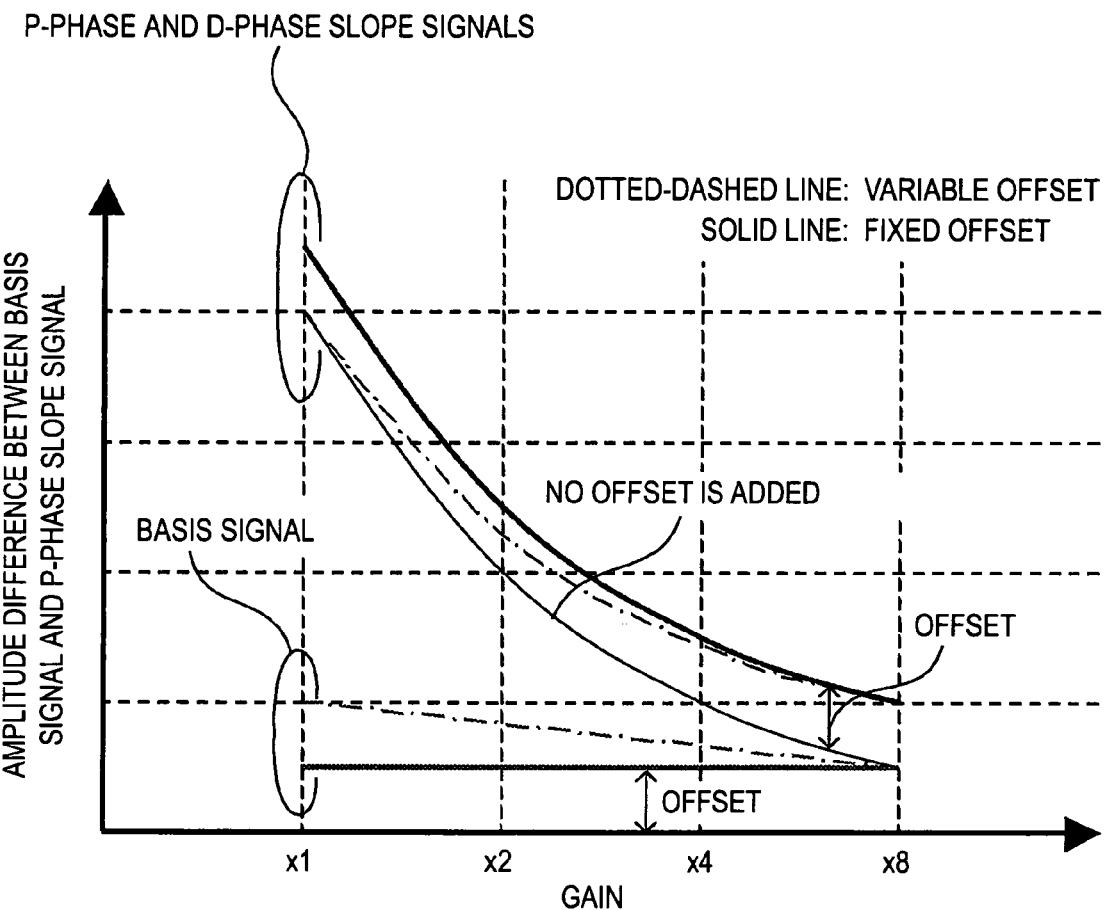
FIG. 14 is a diagram illustrating a variation in amount of the offset depending on a gain.

FIG. 14 is a diagram illustrating the variation in offset depending on the gain. In the above-mentioned examples of offset, the offset added to the basis signal, the P-phase slope signal, and the D-phase slope signal is set to be constant, but the amount of offset may be adaptively changed depending on the gain as shown in FIG. 14.

That is, in FIG. 14, the horizontal axis represents the gain and the vertical axis represents the amplitude difference between the basis signal and the P-phase slope signal. Here, in the drawing, the solid line indicates a constant offset not depending on the gain and the dotted-dashed line indicates an offset variable depending on the gain.

When an offset is added to the basis signal and the amount of offset is constant without depending on the gain, the amplitude difference between the basis signal and the P-phase slope signal is constant. On the contrary, when the amount of offset is variable depending on the gain, the amplitude difference between the basis signal and the P-phase slope signal is set to a greater offset as the gain becomes smaller.

When the gain is small, the slope of the slope signal from the DAC is steep. Accordingly, just after and just before the start of a slope, deterioration in linearity may appear and the effective range having the linearity may decrease. In this case, when the offset in high gain is applied to the low gain without any change, the inversion of the comparator may occur in a region in which the linearity is not be guaranteed just before the end of a slope. Therefore, by setting the offset to be greater as the gain becomes lower, this problem can be avoided.

When an offset is added to the P-phase slope signal and the D-phase slope signal and the amount of offset is constant without depending on the gain, the difference in offset from the level to which no offset is added is constant. On the other hand, when the amount of offset is variable depending on the gain, the difference in offset from the level to which no offset is added is set to be greater as the gain becomes higher.

As described above, when the amplitude of the P-phase slope signal is great, the black spot in great light intensity appearing in the low gain can easily occur. Accordingly, when a constant offset not depending on the gain is superposed, the black spot may be generated. Therefore, by decreasing the amount of offset as the gain becomes lower, this problem can be avoided.

<5. Specific Procedure of Setting Offset>
[First Operation]

Figure 15:
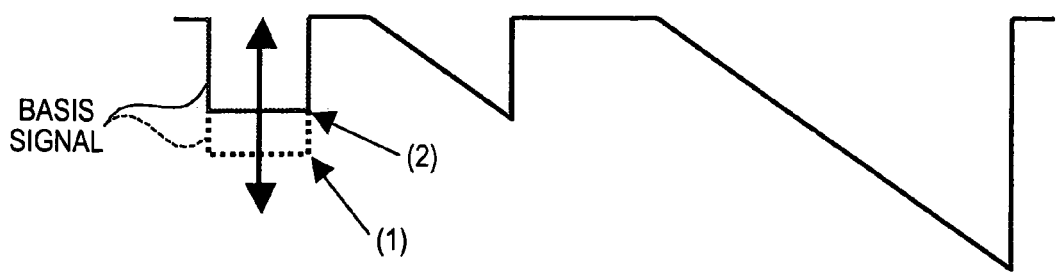
FIG. 15 is a diagram illustrating a specific procedure (first thereof) of setting an offset.

FIG. 15 is a diagram illustrating a specific procedure of setting an offset (first thereof). In the drawing, a variation in reference signal is shown. First, in a reference signal in high gain, the amplitude of the basis signal set in the auto-zero period is set to be the same as the amplitude of the P-phase slope signal (see (1) in the drawing). Then, a predetermined offset is superposed on the basis signal. Accordingly, the basis signal has an amplitude obtained by subtracting the amount of offset from the amplitude of the P-phase slope (see (2) in the drawing). The occurrence of a white spot is checked using the basis signal on which the offset is superposed.

Subsequently, the same amount of offset as set in the high gain is superposed on the basis signal in the low gain. That is, a level obtained by subtracting the amount of offset from the maximum value of the basis signal is set.

The occurrence of a black spot in the great light intensity is checked using the basis signal on which the offset is superposed. Here, when a black spot is generated, the offset is made to decrease by a predetermined amount, the offset is superposed on the basis signal in the high gain, the occurrence of a white spot is checked, the offset is superposed on the basis signal in the low gain, and the occurrence of the black spot in the great light intensity is checked. By repeating these, it is possible to set the amount of offset which can suppress the appearance of both the white spot in the high gain and the black spot in the low gain.

[Second Operation]

Figure 16:
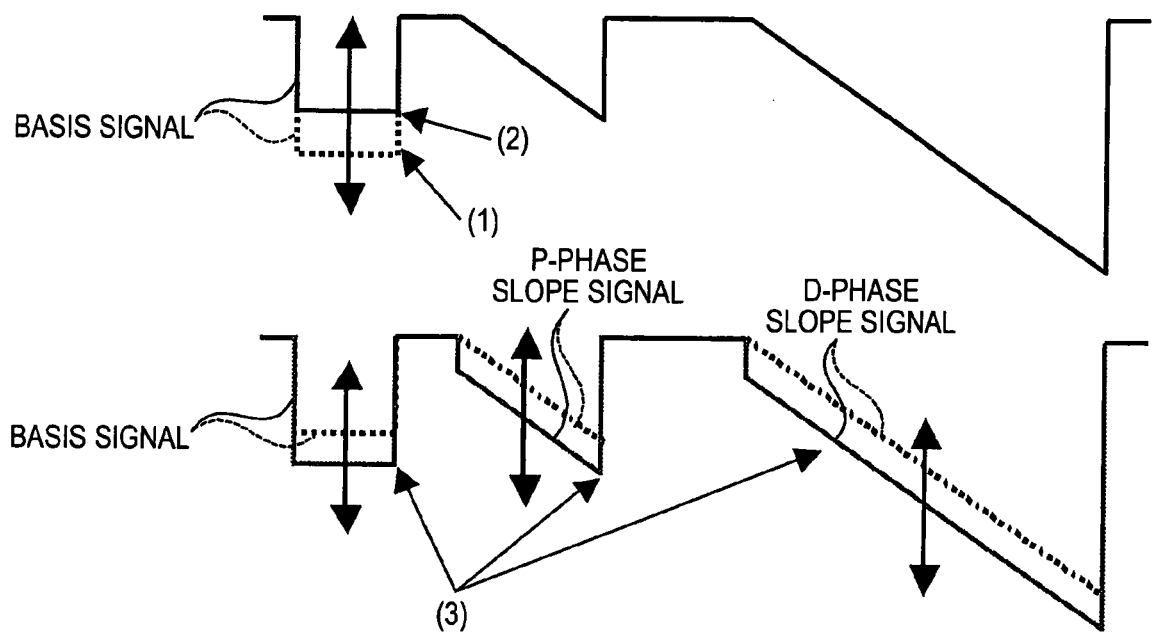
FIG. 16 is a diagram illustrating a specific procedure (second thereof) of setting an offset.

FIG. 16 is a diagram illustrating the specific procedure of setting an offset (second thereof). In this drawing, a variation in reference signal is shown. First, in the reference signal in the high gain, the amplitude of the basis signal set in the auto-zero period is set to the same level as the amplitude of the P-phase slope signal (see (1) in the drawing). Then, a predetermined offset (first offset) is superposed on the basis signal. Accordingly, the basis signal has an amplitude obtained by subtracting the first offset from the amplitude of the P-phase slope signal (see (2) in the drawing). The occurrence of the white spot is checked using the basis signal on which the first offset is superposed.

Subsequently, in the state where the first offset is superposed on the basis signal as the reference signal in the high gain, another offset (second offset) of a constant amount is superposed on all the basis signal, the P-phase slope signal, and the D-phase slope signal in the direction increasing the amplitudes (see (3) in the drawing). The occurrence of a vertical line is checked using the reference signal on which the second offset is superposed. When the vertical line occurs, the amount of the second offset is adjusted and optimized to suppress the occurrence of the vertical line.

In the state where the first and second offsets are superposed, the occurrence of a black spot in the low gain and the great light intensity is checked. When the black spot occurs, the first offset is adjusted to decrease. In some cases, a negative offset is superposed. The occurrence of the white spot and the vertical line in the high gain is checked in this setting of offset. By repeating these, it is possible to set an amount of offset which can suppress all the occurrences of the white spot in the high gain, the vertical line, and the black spot in the low gain.

<6. Configuration of Imaging Apparatus>

Figure 17:
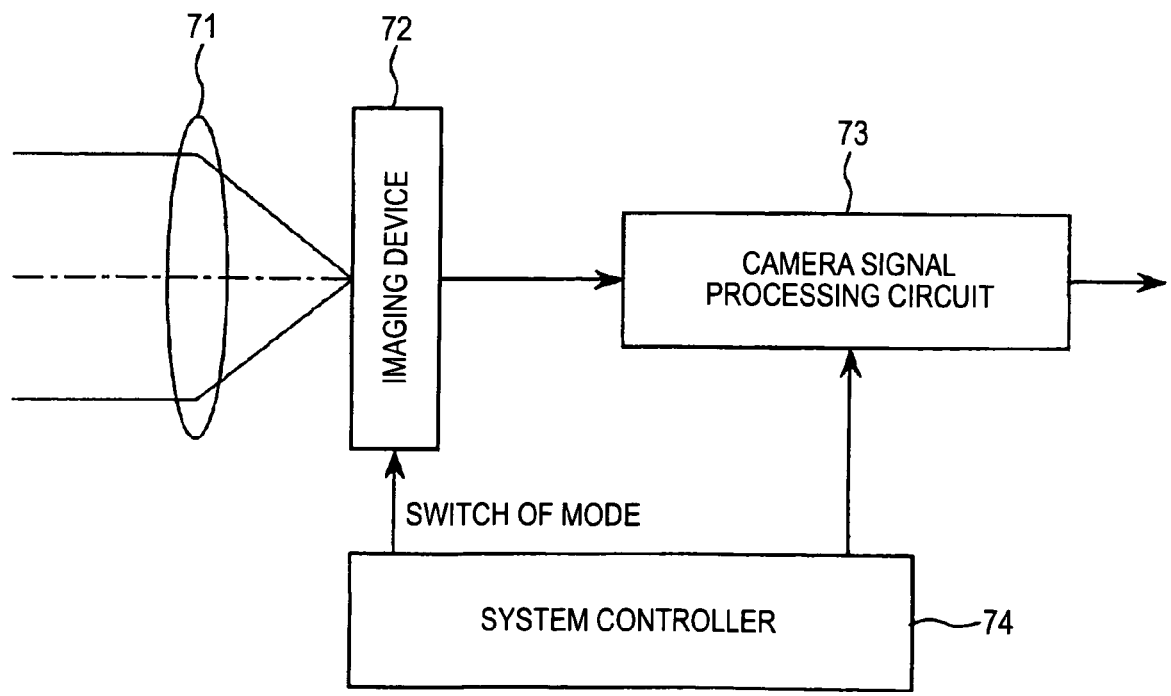
FIG. 17 is a block diagram illustrating a configuration of an imaging apparatus according to an embodiment of the invention.

FIG. 17 is a block diagram illustrating the configuration of an imaging apparatus according to an embodiment of the invention. As shown in FIG. 17, the imaging apparatus according to this embodiment includes an optical system including a lens 71, an imaging device 72, a camera signal processing circuit 73, and a system controller 74.

The lens 71 forms image light from a subject on an imaging plane of the imaging device 72. The imaging device 72 converts the image light formed on the imaging plane by the lens 71 into electrical signals by pixels and outputs the resultant image signals. The above-mentioned solid-state imaging device according to the embodiment of the invention is used as the imaging device 72.

The camera signal processor 73 performs various signal processes on the image signals output from the imaging device 72. The system controller 74 controls the imaging device 72 and the camera signal processor 73. The system controller 74 also performs control of switching an operation mode between a normal frame rate mode in a progressive scanning method in which all pixel information is read and a high frame rate mode in which the frame rate is raised by N times by setting the exposure time of the pixels to 1/N of that in the normal frame rate mode.

According to this embodiment, the trade-off for improvement in characteristic of the photoelectric conversion elements is solved after the end of design of the photoelectric conversion elements, thereby improving the characteristic. Accordingly, it is possible to extend the applicable gain range by the enlargement of the characteristic margin. Since the characteristic margin can be enlarged, it is possible to enhance the yield. It is also possible to reduce the test fabrication for improvement in characteristic, thereby reducing the cost. It is also possible to improve the characteristic without changing the reading speed of signals from the photoelectric conversion elements. By applying the minimum margin necessary between the amplitude of the basis signal and the amplitude of the P-phase slope signal to the entire gain range consistently, the control operation is simplified, thereby reducing the cost through the simplification of the control circuit or the reduction of a selection process.

The present application contains subject matter related to that disclosed in Japanese Priority Patent Application JP 2009-184204 filed in the Japan Patent Office on Aug. 7, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state imaging device comprising:
   a pixel unit in which a plurality of photoelectric conversion elements are arranged;
   a comparison unit comparing a reference signal with a signal acquired by the photoelectric conversion element of the pixel unit;
   a reference signal generating unit generating the reference signal;
   a counting unit counting an amount of time when the relative magnitude of the pixel signal and the reference signal is inverted by the comparison unit; and
   an offset setting unit setting an offset in the reference signal generated by the reference signal generating unit,
   wherein the reference signal generating unit generates as the reference signal a basis signal at the time of non-signaling from the pixel unit, a first slope signal for allowing the counting unit to count the amount of time corresponding to the non-signaling, and a second slope signal for allowing the counting unit to count the amount of time corresponding to the pixel signal acquired by the pixel unit, and wherein the offset setting unit sets the offset in the basis signal, the first slope signal, and the second slope signal generated by the reference signal generating unit.

2. A solid-state imaging device comprising:

a pixel unit in which a plurality of photoelectric conversion elements are arranged;

a comparison unit comparing a reference signal with a signal acquired by the photoelectric conversion element of the pixel unit;

a reference signal generating unit generating the reference signal;

a counting unit counting an amount of time when the relative magnitude of the pixel signal and the reference signal is inverted by the comparison unit; and an offset setting unit setting an offset in the reference signal generated by the reference signal generating unit, wherein the reference signal generating unit generates as the reference signal a basis signal at the time of non-signaling from the pixel unit, a first slope signal for allowing the counting unit to count the amount of time corresponding to the non-signaling, and a second slope signal for allowing the counting unit to count the amount of time corresponding to the pixel signal acquired by the pixel unit, wherein the offset setting unit sets the offset in the basis signal generated by the reference signal generating unit, and wherein the offset setting unit subtracts the offset from the maximum value of the basis signal generated by the reference signal generating unit.

3. A solid-state imaging device comprising:

a pixel unit in which a plurality of photoelectric conversion elements are arranged;

a comparison unit comparing a reference signal with a signal acquired by the photoelectric conversion element of the pixel unit;

a reference signal generating unit generating the reference signal;

a counting unit counting an amount of time when the relative magnitude of the pixel signal and the reference signal is inverted by the comparison unit; and an offset setting unit setting an offset in the reference signal generated by the reference signal generating unit, wherein the reference signal generating unit generates as the reference signal a basis signal at the time of non-signaling from the pixel unit, a first slope signal for allowing the counting unit to count the amount of time corresponding to the non-signaling, and a second slope signal for allowing the counting unit to count the amount of time corresponding to the pixel signal acquired by the pixel unit, wherein the offset setting unit sets the offset in the basis signal generated by the reference signal generating unit, and wherein the offset setting unit sets the offset so that the first slope signal and the second slope signal generated by the reference signal generating unit move to the level of the basis signal.

4. A solid-state imaging device comprising:

a pixel unit in which a plurality of photoelectric conversion elements are arranged;

a comparison unit comparing a reference signal with a signal acquired by the photoelectric conversion element of the pixel unit;

a reference signal generating unit generating the reference signal;

a counting unit counting an amount of time when the relative magnitude of the pixel signal and the reference signal is inverted by the comparison unit; and an offset setting unit setting an offset in the reference signal generated by the reference signal generating unit, wherein the reference signal generating unit generates as the reference signal a basis signal at the time of non-signaling from the pixel unit, a first slope signal for allowing the counting unit to count the amount of time corresponding to the non-signaling, and a second slope signal for allowing the counting unit to count the amount of time corresponding to the pixel signal acquired by the pixel unit, wherein the offset setting unit sets the offset in the first slope signal and the second slope signal generated by the reference signal generating unit, and wherein the offset setting unit sets the same amount of offset in the first slope signal and the second slope signal generated by the reference signal generating unit.

5. The solid-state imaging device according to claim 4, wherein the offset setting unit sets the same amount of offset in the basis signal, the first slope signal, and the second slope signal generated by the reference signal generating unit.

6. The solid-state imaging device according to claim 4, wherein the offset setting unit sets the offset, which corresponds to an amplification factor of a dynamic range of the first slope signal and the second slope signal, in the basis signal, the first slope signal, and the second slope signal generated by the reference signal generating unit.

* * * * *